United States Patent

[11] 3,564,339

| | | |
|---|---|---|
| [72] | Inventors | Harold W. Katz; Murray H. Miller, Ann Arbor, Mich. |
| [21] | Appl. No. | 872,879 |
| [22] | Filed | Oct. 31, 1969 |
| [45] | Patented | Feb. 16, 1971 |
| [73] | Assignee | KMS Industries, Inc. Ann Arbor, Mich. a corporation of Delaware |

[54] CIRCUIT FOR RAPID SHUT-OFF OF ELECTROCHEMICAL MACHINING APPARATUS
11 Claims, 4 Drawing Figs.

[52] U.S. Cl............................................... 317/33, 219/69, 323/22
[51] Int. Cl............................................. H02h 3/00
[50] Field of Search........................................... 317/16, 33; 323/8, 9, 7, 4, 66, 22; 219/69; 213 (Inquired)

[56] References Cited
UNITED STATES PATENTS

| | | | |
|---|---|---|---|
| 2,769,078 | 10/1956 | Matulaitis..................... | 219/69 |
| 3,024,406 | 3/1962 | Porterfield.................... | 219/69 |
| 3,246,113 | 4/1966 | Scarpelli....................... | 219/69 |
| 3,454,834 | 7/1969 | Giannamore................. | 317/33 |
| 3,475,653 | 10/1969 | O'Denberg................... | 317/33 |

*Primary Examiner*—J. D. Miller
*Assistant Examiner*—Ulysses Weldon
*Attorney*—Barnes, Kisselle, Raisch & Choate

ABSTRACT: A circuit for the rapid turnoff of the load current in an electrochemical machining apparatus is disclosed. The approach employed is to shunt the load current through an SCR after a short circuit has been detected. The circuit operates to induce an additional voltage in the load circuit to reduce the load current to zero for a sufficient length of time to permit the SCR's in series with the load to recover their blocking capability.

PATENTED FEB 16 1971

INVENTORS
HAROLD W. KATZ
MURRAY H. MILLER

BY *Barnes, Kisselle,
Raisch & Choate.*
ATTORNEYS

3,564,339

CIRCUIT FOR RAPID SHUT-OFF OF ELECTROCHEMICAL MACHINING APPARATUS

BACKGROUND OF THE INVENTION

1. Field of the Invention

This invention generally relates to control circuits, and more particularly to a circuit for the rapid turnoff of the load current in an electrochemical machining apparatus or other high current, low impedance applications when a short circuit condition has been detected.

2. Description of the Prior Art

Electrochemical machining differs from other metal working techniques in that electrical and chemical energy are the "cutting edges of the tool." In this process, electrical energy is used to bring about a chemical reaction which, in turn, dissolves metal from a workpiece into an electrolytic solution. Metal removal is accomplished through the principal of electrolysis. When direct current is applied to two pieces of metal submerged in a suitable electrolytic solution, metal is removed from one electrode. The rapidly flowing electrolyte carries away the metal ions, and hydrogen gas is generated at the cathode. The rate of metal removal is proportional to the electric current flowing.

In an electrochemical machining apparatus, the cutting tool and the workpiece being machined comprise the two electrodes. Physical contact of the tool with the workpiece or other foreign matter produces a short circuit condition which causes sparks often resulting in the damaging of the workpiece and the tool. To guard against sparks, tools are designed to provide a uniform flow of electrolyte over all areas of the cutting surface; however, in spite of this, short circuits occasionally occur. It has, therefore, been found desirable to rapidly cut off the current in the workpiece when a short circuit develops.

There are presently two methods of turning the machine off. In the first of these, a sensing circuit simply causes the main power in the primary circuit to be turned off. This, however, allows the current in the tool to decay for tens of milliseconds which is unsatisfactory. In the second method, a shunt bank of SCR's is placed across the tools. A sense circuit triggers the SCR's on, and the tool current is supposed to be shunted into the SCR bank. However, it takes a large number of SCR's to reach a resistance that is lower than the short circuit resistance of the tool and the workpiece which are touching. Even when the SCR's maintain a voltage of approximately 1.5 to 2.5 volts across the workpiece this voltage continues to force some current through the workpiece. In order to completely remove the current from the load, it is necessary to introduce an extremely high impedance in series with the load.

SUMMARY OF THE INVENTION

It is therefore an object of the present invention to provide a circuit for the rapid shutoff of an electrochemical machining apparatus wherein the load current is almost immediately shunted into a parallel SCR bank upon detection of a short circuit condition.

It is a further object of this invention to provide a circuit of the type described wherein the shunt bank need consist of only a few SCR's to carry the load current for a short period of time.

According to the present invention, the foregoing and other objects are attained by providing a circuit for the rapid turnoff of the load current of an electrochemical machining apparatus which shunts the load current through an SCR bank after a short circuit has been detected. Since the impedance of the short circuit is so much smaller than the SCR, it is necessary to provide an additional voltage in the load circuit, equal to the shunt SCR voltage drop, to reduce the load current to zero for a sufficient length of time so that a SCR can recover its blocking capability and the primary relays can be activated. This voltage is induced by means of a transformer so designed that a voltage equal to the SCR "on" voltage of approximately 1 ½ to 2 volts can be maintained for a period of time grater than the recovery time of the series SCR bank. The transformer comprises a magnetic core constructed of a square hysteresis loop material and having three windings. The DC current through the tool biases the core in one direction through one of the windings. An additional DC current in a second winding acts to bias the core in the opposite direction. The turns ratio is adjusted so that the net difference between the two DC currents brings the core to a predetermined intermediate point. The third winding has an !SCR, a capacitor, and an LC network connected such that when the SCR is triggered, the capacitor discharges through the LC network and the third winding. This produces a voltage pulse across the winding of the proper polarity and duration to turn off the series second SCR. After the capacitor discharges, the current in the second winding of the transformer returns the core to saturation.

BRIEF DESCRIPTION OF THE DRAWINGS

The specific nature of the invention, as well as other objects, aspects, uses and advantages thereof, will clearly appear from the following description and from the accompanying drawing, in which.

DESCRIPTION OF THE PREFERRED EMBODIMENTS

Figure 1:
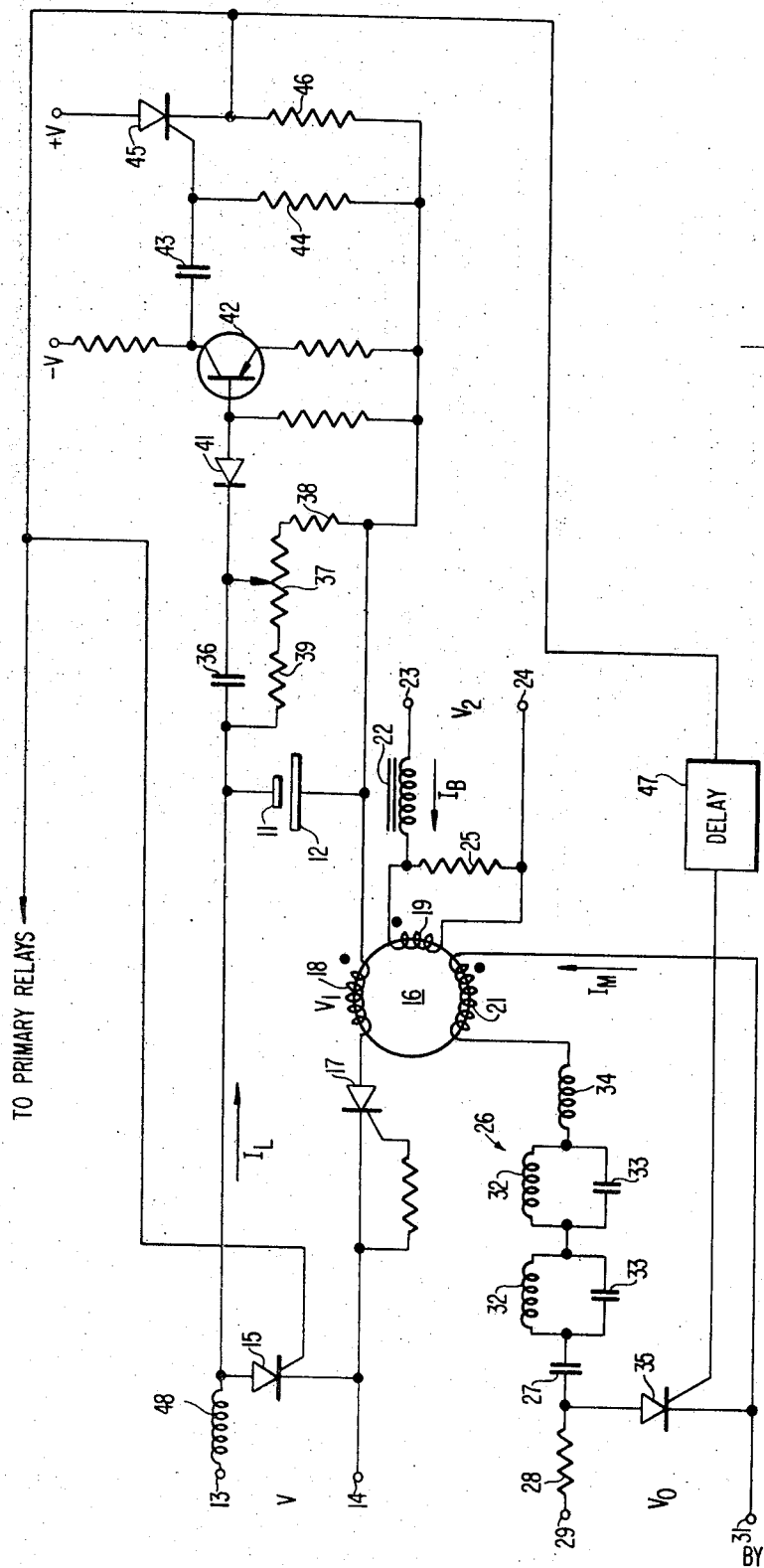
FIG. 1 is a schematic diagram of the circuit according to the invention.

Referring now to the drawings wherein like reference numerals designate identical or corresponding parts throughout the several FIGS., and more particularly to FIG. 1, a tool 11 and a workpiece 12 in an electrochemical machining apparatus are connected across a source of voltage V by means of terminals 13 and 14. The voltage V causes a load current $I_L$ to circulate from terminal 13 to the tool 11 and workpiece 12 and back to terminal 14. The circuit operates to shunt the load current $I_L$ into the SCR 15 when a short circuit is detected. It should be understood that the SCR 15 is actually a bank of SCR's sufficient to carry the load current $I_L$ and that other electronic switching devices having characteristics similar to an SCR may be used. Since the impedance of the short circuit is so much smaller than the impedance of SCR 15, an additional voltage $V_1$ is induced in the load circuit by means of transformer 16 to reduce the load current $I_L$ to zero for a sufficient length of time so that SCR 17 can recover its blocking capability and primary relays of the apparatus can be activated. If a very low impedance short circuit is developed between the tool and workpiece, the load current $I_L$ can at best divide equally between the shunt and series SCR. For example, if $I_L = 2,000$ amperes, then 1,000 amps would still flow through the load if it were a complete short circuit. In other words, with just the use of a series and parallel bank of SCR's, the current $i$ in the load under "sparking" conditions would be determined by $$V_P = iR + V_S \text{ and } I_L = i + i_P$$

where $V_P$ equals the "on" voltage drop of the shunt SCR
$V_S$ equals the "on" voltage drop of the series SCR
R equals resistance of load under sparking conditions
$i_P$ equals current through the shunt SCR.

Under conditions of extremely large currents $I_L$, even small differences between the SCR characteristics $V_P$ and $V_S$ would permit large currents to flow through a "short-circuited load." Hence, a major objective of the magnetically induced voltage $V_1$ is to guarantee that under all sparking conditions the load current would drop to zero. The voltage $V_1$ induced by the first winding 18 of transformer 16 is equal to the SCR "on" voltage of approximately 1 ½ to 2 volts. Typically, this voltage has a duration of 1 millisecond; however, it is possible to design the magnetic circuit so that the pulse duration would be 18 to 20 milliseconds, i.e., a time sufficiently long so that the primary relays could operate and allow for the decay of the stored energy in the main transformer. In this latter case, SCR 17 could be eliminated.

The complete magnetic circuit includes, in addition to winding 18, a second winding 19 and a third winding 21, all wound on a common core. The magnetic core is composed of a square hysteresis loop material. The second winding 19 is connected through a choke coil 22 to a source of biasing voltage $V_2$ connected to terminals 23 and 24. A resistor 25, which partially terminates the network when the load current is zero, is connected in shunt with winding 19. The third winding 21 is connected through an LC pulse forming network 26, a charging capacitor 27, and a resistor 28 to a source of charging voltage $V_0$ connected across terminals 29 and 31. The LC pulse forming network 26 comprises a plurality of parallel connected inductors 32 and capacitors 33 connected in series to produce a rectangular voltage pulse $V_1$. An additional inductor 34 may be connected in series with the series connected parallel circuits. A third SCR is connected between the junction of resistor 28 and capacitor 27 and the terminal 31.

Figure 2:
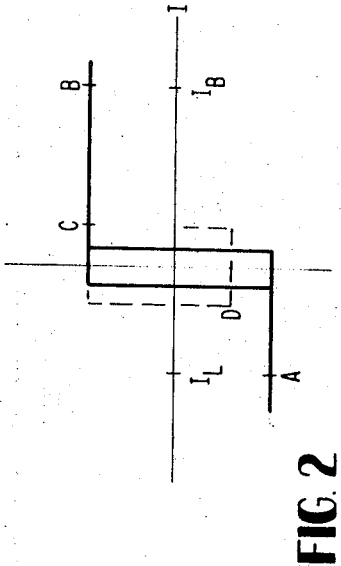
FIG. 2 graphically illustrates the square hysteresis loop characteristic of the core of the transformer and the effect of the current in the several windings thereon.

The operation of the magnetic circuit will be described with reference to FIG. 2 of the drawing. The DC current $I_L$ through the tool biases the core of transformer 16 to point A through winding 18. An additional DC current $I_B$ in winding 19 acts to bias the core to point B. The turns ratio between the windings 18 and 19 is adjusted so that the net difference between $I_B$ and $I_L$ brings the core to point C on the curve. When a short circuit is detected, SCR 15 is fired first and then SCR 35 is fired with a slight delay to allow the shunt SCR voltage to drop to its on-state value. SCR 35 could also be triggered by the change in voltage across the shunt SCR in order to obtain better synchronization. Capacitor 27, which was charged by the voltage $V_0$ through resistors 28, then discharges through the LC network 26 and winding 21. This produces a voltage pulse across winding 21 of the proper polarity and duration to turn off SCR 17. The current $I_M$ switches the core toward point D, while $I_L$ goes to zero. After capacitor 27 discharges, the current $I_B$ returns the core to saturation.

Referring again to FIG. 1 of the drawings, the circuit for sensing a short circuit condition and triggering the SCR's 15 and 35 will now be described.

A voltage divider is formed by potentiometer 37 and resistors 38 and 39. A capacitor 36 is connected from terminal 13 (or the tool 11) to the center tap of the potentiometer 37. A diode 41 has its cathode connected to the junction of capacitor 36 and the wiper of potentiometer 37 and its anode connected to the base of transistor 42. During normal operation, the DC voltage across the tool and workpiece charges the capacitor 36 to a fraction of the working voltage V determined by the setting of the wiper of the potentiometer 37. Under these conditions diode 41 is biased into its nonconducting state. If a short circuit is produced across the workpiece, then the full voltage of capacitor 36 appears across diode 41 and the base-emitter junction of transistor 42, driving the transistor 42 into conduction. A coupling network comprising a capacitor 43 and a resistor 44 transfers the amplified pulse from the collector of transistor 42 to the gate electrode of SCR 45. Alternative coupling means may be used, for example, coupling from the emitter or through pulse transformers. The transistor 42 may be replaced by similarly acting circuitry, for example, a monostable multivibrator which accepts the voltage pulse through diode 41 and generates a standardized pulse to SCR 45. The pulse to SCR 45 causes this SCR to conduct and supply current to trigger SCR 15 and to activate the primary relays. After a short delay produced by delay device 47, SCR 35 is triggered "on." The delay device 47 may be, for example, a passive delay line.

In some applications where it is necessary to shut off the load current during partial shorts, it may be necessary to detect the short by measuring the change in load current rather than the voltage. This will occur in those cases where the load impedance is larger than the supply impedance. Under this condition the voltage change across the load would not be detectable.

There has thus been described a circuit for the rapid shutoff of an electrochemical machining apparatus which operates in a very short period of time to shunt the load current into an SCR bank when a short circuit condition is detected. At the same time, the SCR bank consists of only a few SCR's sufficient to carry the load current. In order to prevent a rapid rise in current through the shunt SCR's, it may be necessary to add a small inductance 48 between terminal 13 and SCR 15.

Figure 3:
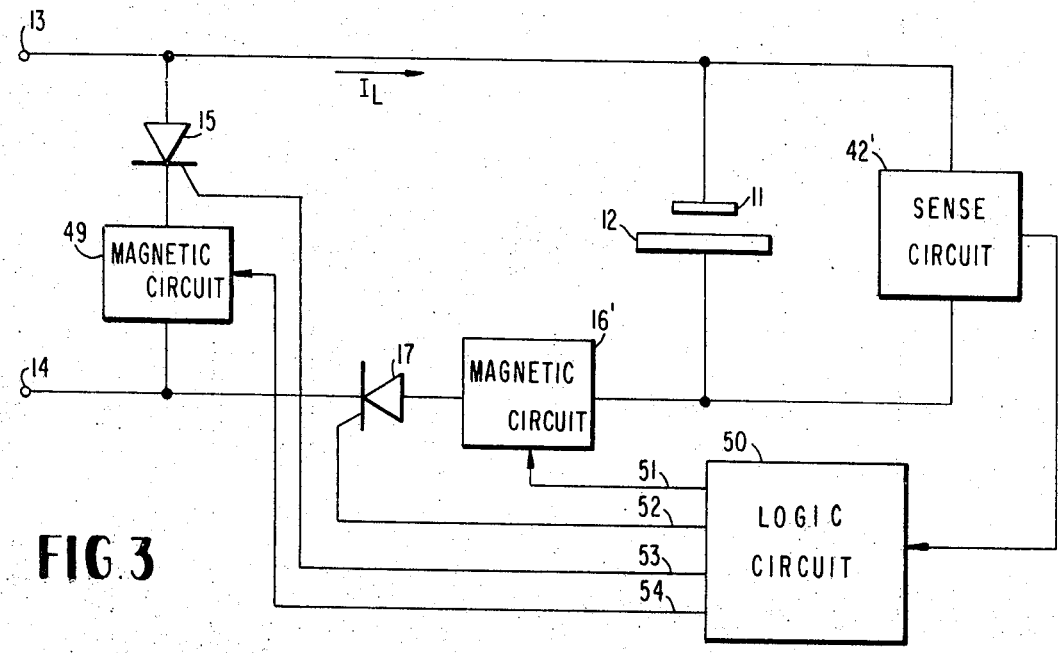
FIG. 3 is a partial block and partial schematic diagram of a modification of the invention.

FIG. 3 of the drawings shows a modification of the invention using two magnetic circuits. In this embodiment, magnetic circuit 16' corresponds to transformer 16 and sense circuit 42' corresponds to the sense circuit comprising transistor 42 in FIG. 1. In this case, however, a second magnetic circuit 49 similar to magnetic circuit 16' is connected in series with the SCR bank 15. A logic circuit 50 receives the output of the sense circuit 42' and generates a series of output pulses which are delivered over lines 51 to 54 to magnetic circuit 16', SCR 17, SCR bank 15, and magnetic circuit 49, respectively.

Figure 4:
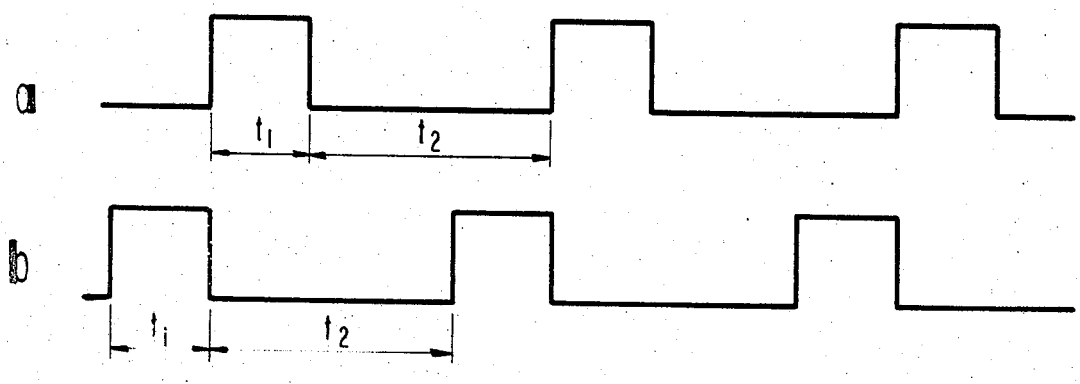
FIG. 4 is pulse timing diagram illustrating the outputs of the logic diagram employed in the circuit of FIG. 3.

The relative timing of the output pulses from logic circuit 50 is shown in FIG. 4. Pulse train $a$ is delivered over output lines 51 and 53 to magnetic circuit 16' and SCR bank 15, respectively, to produce the operation described with respect to FIG. 1. Pulse train $b$, on the other hand, is delivered over lines 52 and 54 to SCR 17 and magnetic circuit 49. The on-time and off-time durations $t_1$ and $t_2$ of the two pulse trains can be arbitrarily chosen for each application. It should be noted that the pulse diagrams shown in FIG. 4 ignore any necessary delay times required between the two outputs in the output line pairs 51, 53 and 52, 54. Thus, for example, the pulse output on line 51 may be slightly delayed with respect to that on-time 53 as described with respect to FIG. 1. In like manner, the pulse output on line 54 may be slightly delayed with respect to the output on line 53. It is assumed that these delays are produced by delay circuits similar to delay 47 which comprise a part of logic circuit 50.

Logic circuit 50 may be constructed in a straightforward manner and may comprise, for example, an astable multivibrator which is gated on by an output from sense circuit 42' and reset to one of its two states in the absence of an output from sense circuit 42'. The switching period of the astable multivibrator would be equal to one-half $t_1$ plus $t_2$. Two monostable multivibrators connected in series to one of the outputs of the astable multivibrator would produce the pulse trains $a$ and $b$ shown in FIG. 4. Thus, the first monostable multivibrator would fire on the negative-going output of the astable multivibrator to produce a pulse having a duration of $t_1$. This output would be pulse train $b$. The second monostable multivibrator would fire on the negative-going output of the first monostable multivibrator to produce a pulse having a duration of $t_1$. This output would be pulse train $a$. Clearly, other circuits which will produce the same outputs will suggest themselves to those skilled in the art. The circuit described is given merely by way of example.

In the operation of the circuit shown in FIG. 3, magnetic circuit 16' operates to rapidly transfer the load current $I_L$ from the tool to the shunt SCR bank 15 in the event of a short circuit as described with respect to FIG. 1. SCR 17 is thus given time to recover so that no current flows in the load when the magnetic pulse is completed. With the other magnetic circuit inserted in series with the shunt SCR bank 15, it is now possible to pulse the load current back and forth between the load and shunt SCR bank without having to shut down the main power.

Obviously, the circuits described may be readily adapted to other environments where it is desired to effect a rapid turnoff of load current to a machine in the event of a short circuit. It will therefore be apparent that the embodiments shown are only exemplary and that various modifications can be made in construction and arrangement within the scope of the invention as defined in the appended claims.

We claim:

1. A circuit for the rapid shutoff of load current to a machine, comprising:
   a. means for detecting a short circuit condition in the machine and producing a triggering output;
   b. electronic switch means connected in shunt with the machine and responsive to said triggering output of said detecting means to be triggered "on" when a short circuit is detected; and
   c. means responsive to said triggering output for producing an additional voltage in the load circuit to reduce the load current to the machine to zero thereby establishing the shunt circuit through said electronic switch means.

2. A circuit as recited in claim 1 wherein said electronic switch means is an SCR and further comprising a second SCR connected in series with said machine and normally conducting the load current, and wherein the voltage produced by said voltage producing means has a duration sufficient to enable said second SCR to recover its blocking capabilities.

3. A circuit as recited in claim 1 wherein said voltage producing means comprises:
   a. transformer means having at least first and second windings, said first winding being connected in series with said machine; and
   b. pulse producing means connected to said second winding for inducing a voltage pulse in said first winding in response to the triggering output of said detecting means.

4. A circuit as recited in claim 3 wherein said transformer means includes a core of square hysteresis loop material and a third winding wound thereon, and further comprising biasing means connected to said third winding for biasing the core towards saturation in opposition to the load current.

5. A circuit as recited in claim 3 wherein said pulse producing means comprises:
   a. pulse forming means; and
   b. a discharge circuit connected to said pulse forming means.

6. A circuit as recited in claim 5 wherein said pulse forming means comprises a plurality of parallel-connected inductors and capacitors connected in series between one end of said second winding and said discharge circuit.

7. A circuit as recited in claim 6 wherein said discharge circuit comprises:
   a. a capacitor connected across a source of charging current; and
   b. an SCR connected between said source of charging current and the other end of said second winding and responsive to said triggering output to cause said capacitor to discharge through said pulse forming means.

8. A circuit as recited in claim 1 wherein said detecting means comprises:
   a. a voltage divider connected across the machine,
   b. normally nonconducting means connected to said voltage divider and responsive to a short circuit condition in said machine to become fully conductive, and
   c. triggering means connected to said normally nonconducting means for initiating said trigering output when said normally nonconducting means becomes fully conductive.

9. A circuit as recited in claim 1 further comprising:
   a. pulse generating means responsive to said triggering output for generating two series of pulses, one of said series being connected to said electronic switch means and means for producing an additional voltage; and
   b. means responsive to the other one of said two series of pulses for producing a second voltage connected in series with said electronic switch means and in shunt with the machine whereby the load current is pulsed back and forth between the machine and the electronic switch means.

10. A circuit as recited in claim 9 wherein said electronic switch means is an SCR and further comprising a second SCR connected in series with said machine and connected to triggered "on" by said other one of said two series of pulses, and wherein the voltage produced by said additional voltage producing means has a duration sufficient to enable said second SCR to recover its blocking capabilities and the voltage produced by said second voltage producing means has a duration sufficient to enable the first SCR to recover its blocking capabilities.

11. A circuit as recited in claim 10 wherein said additional voltage producing means and said second voltage producing means are magnetic circuits comprising transformers including cores of square hysteresis loop material.